(No Model.) 6 Sheets—Sheet 1.

F. W. HEWES.
INDEXING MACHINE.

No. 396,742. Patented Jan. 29, 1889.

Witnesses:
Walter S. Logan
F. Estelle Briggs

Inventor:
Fletcher W. Hewes
by his attorney
Salter S. Clark.

(No Model.)

F. W. HEWES.
INDEXING MACHINE.

No. 396,742. Patented Jan. 29, 1889.

Witnesses:
Walter S. Logan
F. Escuele Driggs

Inventor:
Fletcher W. Hewes,
by his attorney
Salter S. Clark (No Model.)  6 Sheets—Sheet 4.

F. W. HEWES.
INDEXING MACHINE.

No. 396,742. Patented Jan. 29, 1889.

Witnesses:

Inventor:

(No Model.) 6 Sheets—Sheet 5.
F. W. HEWES.
INDEXING MACHINE.

No. 396,742. Patented Jan. 29, 1889.

Witnesses:
Walter S. Logan
F. Estelle Briggs

Inventor:
Fletcher W. Hewes
by his attorney
Walter S. Clark (No Model.)  6 Sheets—Sheet 6.

F. W. HEWES.
INDEXING MACHINE.

No. 396,742. Patented Jan. 29, 1889.

Witnesses:
Walter S. Logan
F. Estelle Briggs

Inventor:
Fletcher W. Hewes,
by his attorney
Salter S. Clark.

UNITED STATES PATENT OFFICE.

FLETCHER W. HEWES, OF BLOOMFIELD, NEW JERSEY.

INDEXING-MACHINE.

SPECIFICATION forming part of Letters Patent No. 396,742, dated January 29, 1889.

Application filed August 1, 1887. Serial No. 245,895. (No model.)

*To all whom it may concern:*

Be it known that I, FLETCHER W. HEWES, of Bloomfield, in the county of Essex and State of New Jersey, have invented a new and useful Improvement in Indexing-Machines for Books, of which the following is a specification.

My invention relates to machines which cut in the edges of a book a series of nicks to mark predetermined divisions of the work and facilitate ready opening at such places, such as the one for which Letters Patent of the United States No. 343,175 were granted to me, dated June 8, 1886, and upon which my present invention is an improvement.

The present invention consists, in general, of the following improved devices as applied to a machine of that character: a descending rotary cylindrical knife making a shearing cut; the pivoted table for the book made adjustable to different inclines to accommodate books of various thicknesses; adjustable shaping-stops near the knife to shape the edge of the book, so that the nicks may be uniform and suited to the thickness of the book: a movable cutting-block and mechanism to drop the same after each cut to remove the chips and allow the colorer to enter the nick; a positive escapement device consisting of cam-groove and rocking bar with racks and ratchets to govern the movement of the book-carriage down the incline; an improved colorer by which the color is supplied to the nick and improved mechanism to operate it;
adjustable book holders or clamps to hold the book to the carriage; mechanism by which power is intermittently applied to operate the machine, and various details and combination, as more particularly hereinafter described and claimed.

Figure 1:
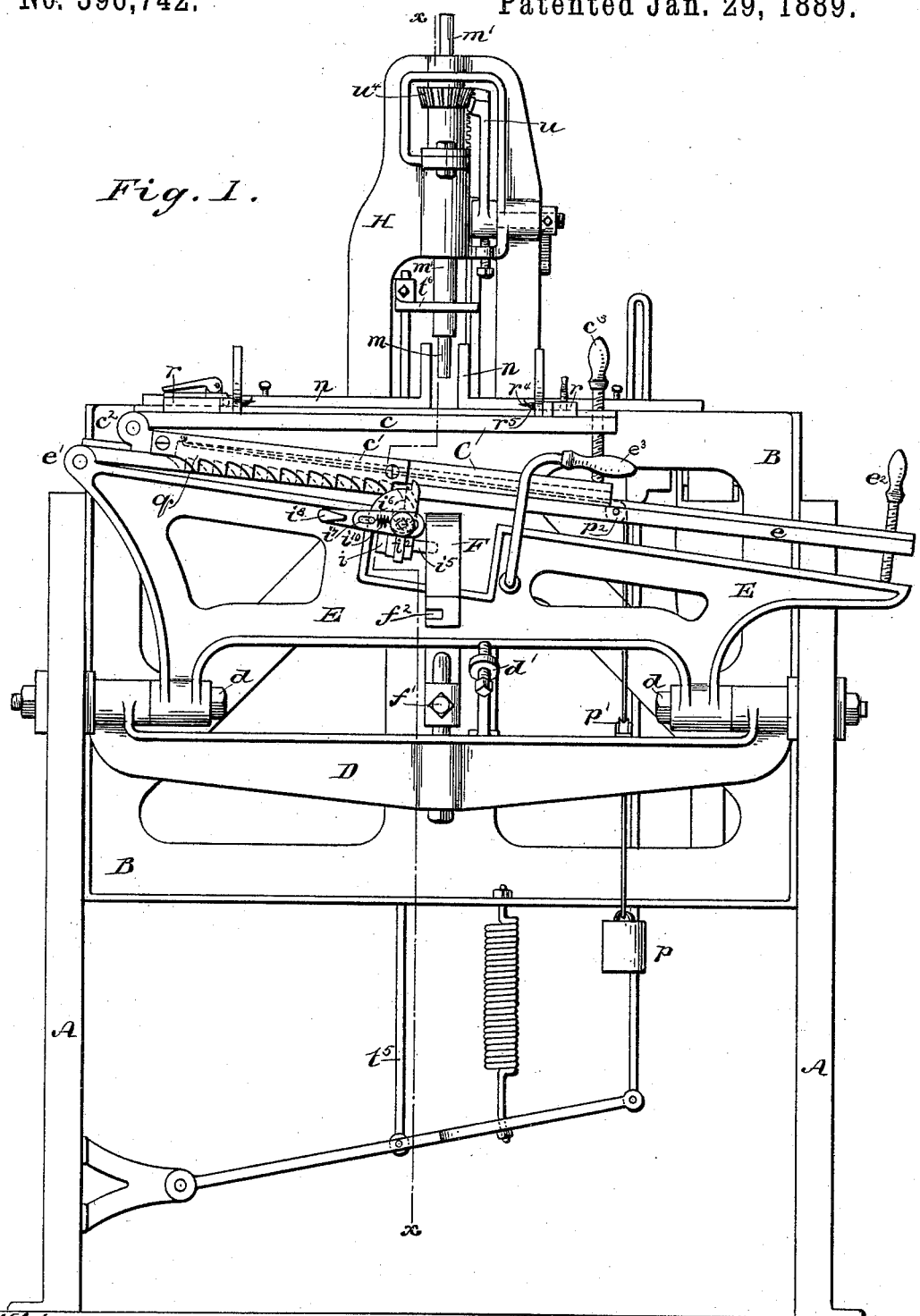
Figure 2:
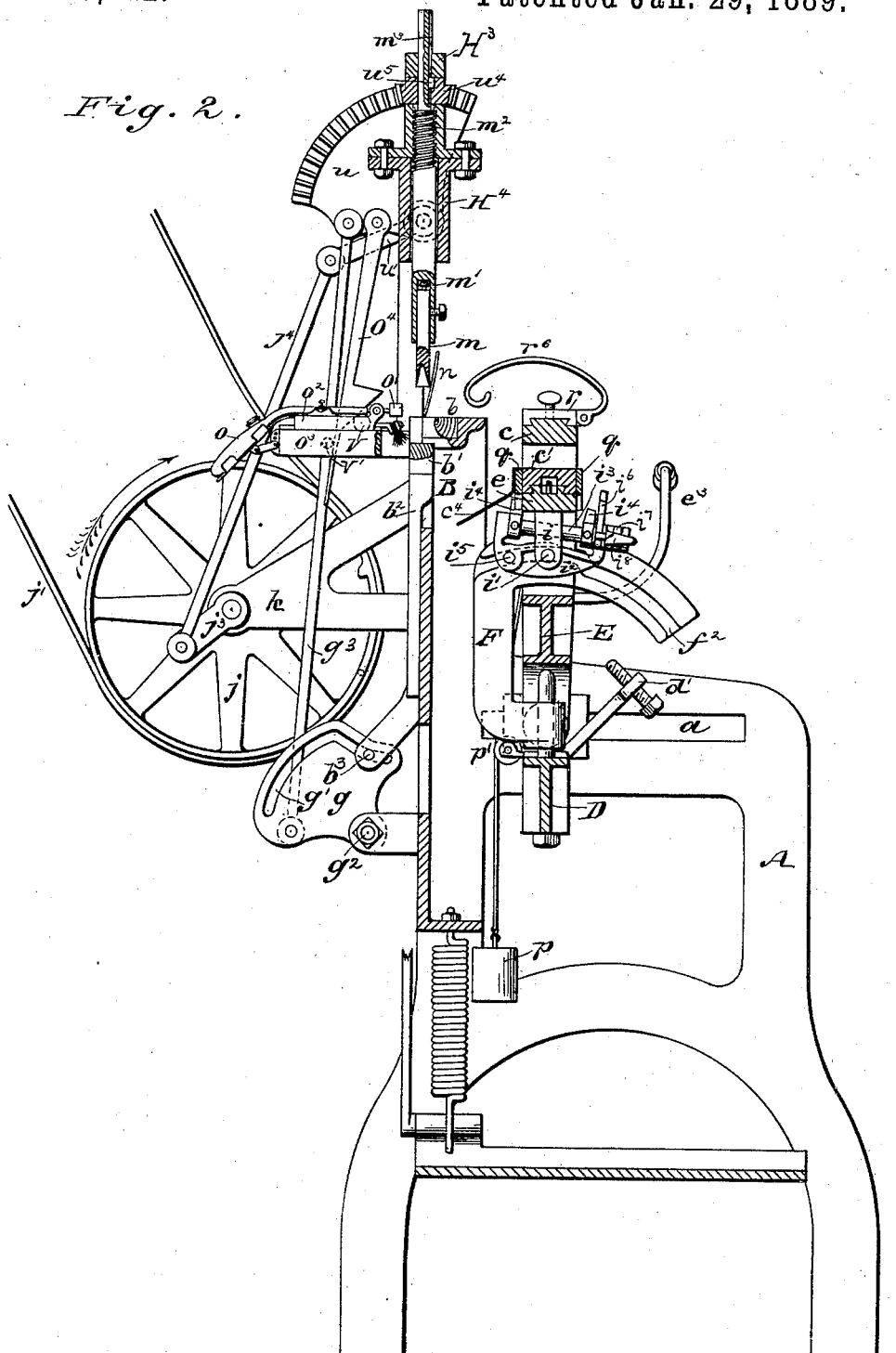
Figure 3:
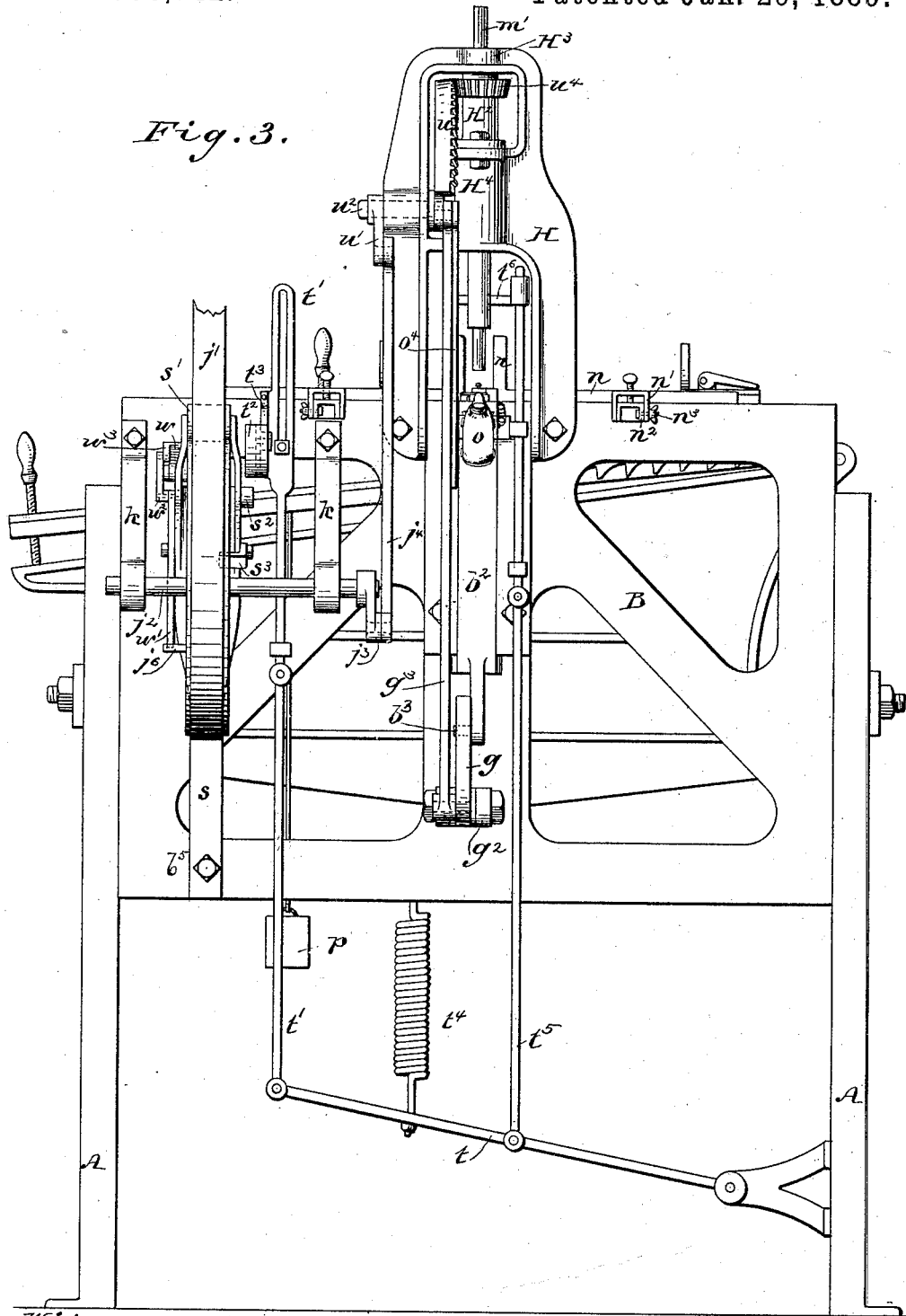
Figure 4:
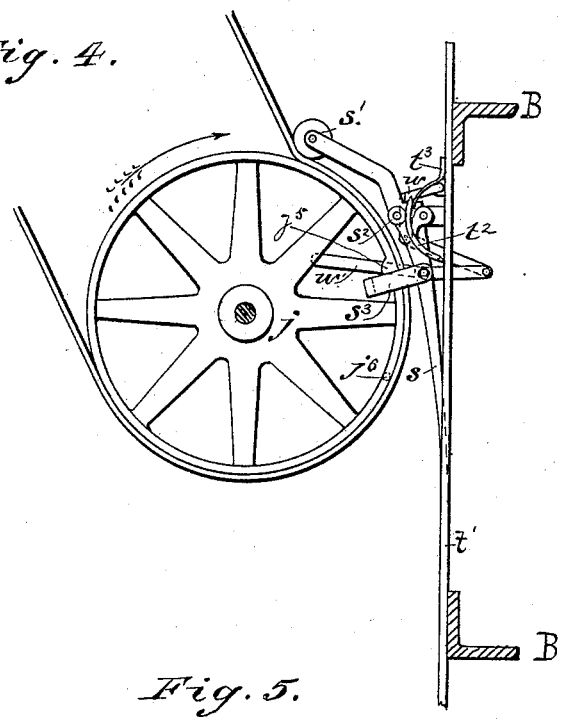
Figure 5:
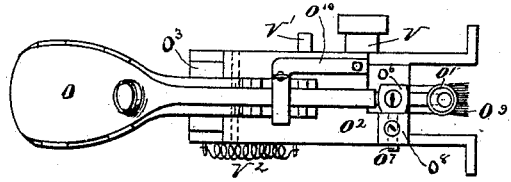
Figure 6:
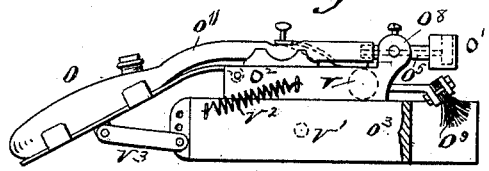
Figure 8:
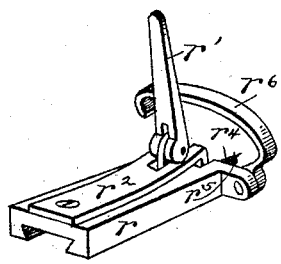
Figure 7:
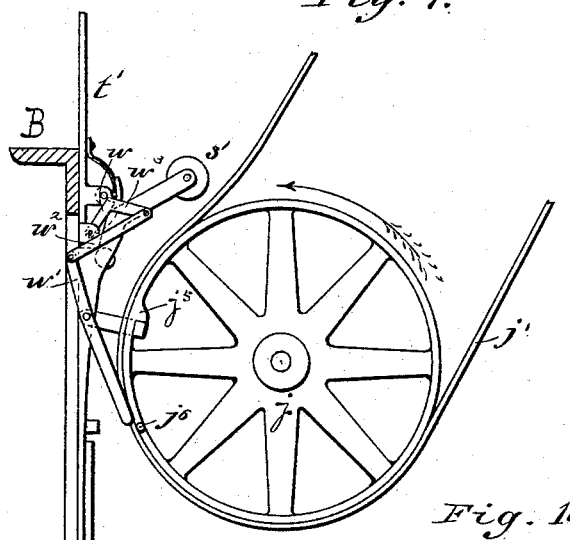
Figure 9:
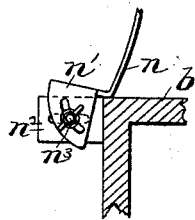
Figure 10:
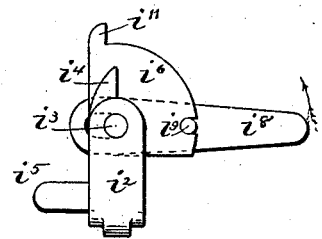
Figure 11:
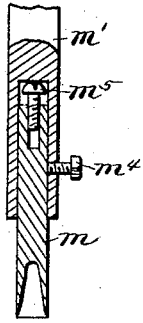
Figure 12:
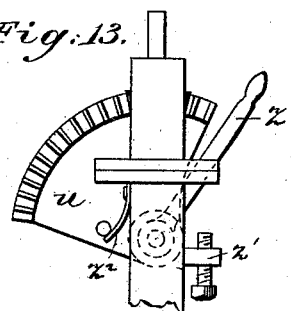
Figure 13:
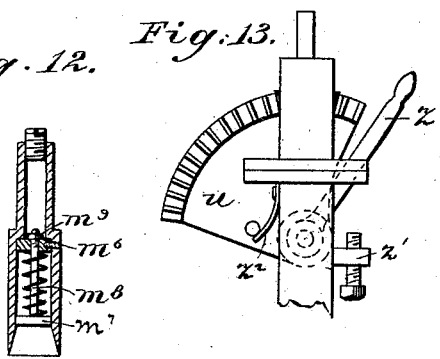
Figure 14:
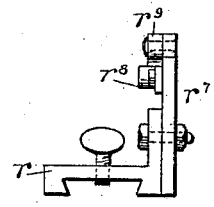
Figure 15:
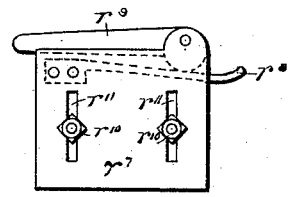
Figure 16:
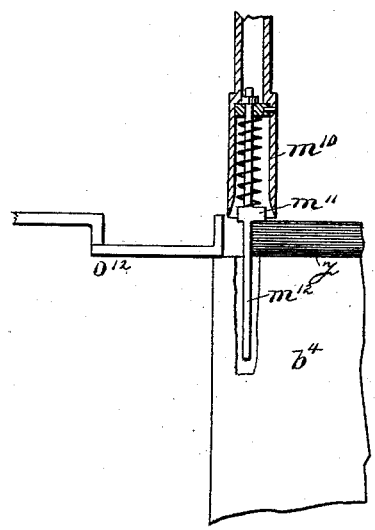
Figure 17:
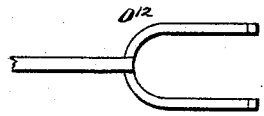

In the accompanying drawings, in which the same characters indicate the same parts in the various views, Figure 1 is a front view of the entire machine from the position of the operator. Fig. 2 is an end view, partly sectional, upon the line *x x* and from the left-hand end of Fig. 1, leaving out the belt-tightening device. Fig. 3 is a rear view of the entire machine. Figs. 4 and 7 are side views of the belt-tightening device from opposite sides and in opposite positions, the rear view of which is seen to the left in Fig. 3. Figs. 5 and 6 are a top and side view, respectively, of the coloring mechanism, also shown in Fig. 2. Fig. 8 is a perspective view of the book holder or clamp sliding upon the top of the book-carriage and to be placed one each side of the book. Figs. 14 and 15 are end and rear views, respectively, of another form of book-clamp. Fig. 9 is an end view of one of the pair of shaping-stops. Fig. 10 is a rear view of the escapement device, of which other views are shown in Figs. 1 and 2. Figs. 11 and 12 are sectional views of two forms of the knife. Fig. 13 is a side view of mechanism to operate the machine by hand instead of by power. Figs. 16 and 17 are figures showing the adaptation of the machine to the purposes of a label-cutter.

The main frame of the machine, Figs. 1, 2, and 3, consists of the parts A, B, and H, A being the sides, B an upright frame-work connecting the two sides A, and the top of which forms the cutting-table *b* for the edges of the leaves to rest upon while under the knife, and H a further upright extension to which the knife-operating parts are connected.

The knife *m* is cylindrical, and is carried at the lower end of a shaft, $m'$, Fig. 2, which, as it revolves, also moves up and down by means of the screw $m^2$ upon the shaft $m'$, gearing with the thread in the nut $H^2$, which is bolted to and thus forms a part of the frame H.

Referring to Figs. 2 and 3, *j* is a pulley which receives power from the belt $j'$, and whose shaft $j^2$ turns in bearings in the brackets *k*, affixed to the frame B. The side upon which the pulley *j* is attached I shall call the "rear" of the machine, and that upon which the operator stands the "front." The crank-arm $j^3$ is attached to the end of the shaft $j^2$, and its connecting-rod $j^4$ is pivoted at the other end to the crank-arm $u'$. The crank-arm $u'$ is affixed to the shaft $u^2$, turning in bearings in the frame H, and having affixed to its opposite end the sector *u*, bearing a segmental gear. The crank-arm $u'$ is longer than the crank-arm $j^3$, so that the revolution of the crank-arm $j^3$ simply oscillates the crank-arm $u'$ and the sector *u*. The gear upon *u* gears with the gear-wheel the sector $u^4$, which is held vertically in the frame H, and is mounted loosely upon the shaft $m'$. A feather, $u^5$, fast upon the interior of the gear-wheel $u^4$, fits into the feather-way $m^3$ in the shaft $m'$, Fig. 2, so that the rotation of the gear-wheel $u^4$ serves to rotate the shaft $m'$, and also, by means of the screw $m^2$, to send it up and down through its bearings $H^3$ and $H^4$ in the frame H, the shaft $m'$ passing freely through the gear-wheel $u^4$.

In the drawings the knife is represented at about its highest position. If now the pulley $j$ be turned in the direction indicated by the arrow, the motion transmitted through the parts just described gives for a half-revolution of the pulley $j$ a combined descending and rotary motion of the knife. This cuts from the edge of the book lying under it the nick desired, completing the cut as the crank-arm $u'$ reaches its highest point of oscillation. The reverse motion of the crank-arm $u'$—that is, the remainder of the revolution of the pulley $j$—carries the knife back to its original position.

The improvement over the knife specially described in my prior patent, hereinbefore referred to, is that a descending knife cutting against a stationary cutting-block makes a cleaner cut, especially in soft spongy paper, while its rotary motion enables the cut to be made with much less power than if the knife were simply forced down without rotation.

The improved book-carriage, (upon which the back part of the book rests,) with its connecting parts, is shown in Figs. 1 and 2.

C is the carriage, consisting of two parts, $c$ and $c'$, which are hinged together horizontally at one end, $c^2$, and at the other are separated by the adjustment-screw $c^3$. The under part, $c'$, slides upon the inclined plane, being kept thereon by a dovetail or in any other appropriate way, and the back part of the book rests upon the top of the upper part, $c$, which should be parallel with the table $b$ at all times, and substantially upon a level with it when the carriage is at the top of the inclined plane. A weight, $p$, whose cord passing over two rollers, $p'$ and $p^2$, and through a groove in the under side of the part in two places, $c'$, is attached to $c'$ near the hinge $c^2$, tends continuously to draw the carriage down the inclined plane.

The inclined plane $e$ is hinged horizontally at $e'$ to the part E, and these parts, with the carriage C, form an oscillating table, by which the book, which is clamped thereto, may be alternately withdrawn from and brought up to the knife. The adjustment-screw $e^2$ allows the inclination of the inclined plane $e$ to be varied at will. The open space between the oscillating table, which supports the back of the book, and the cutting-table $b$, upon which its edge lies, gives a space into which the cut leaves may hang down, as explained in my prior patent. A shield, $c^4$, attached to the carriage C, prevents the falling chips from clogging its parts and protects the cut leaves from injury. In the two sides of the frame A are horizontal slots $a$, Fig. 2, in which rest the ends of a bar, D, Fig. 1. This bar D forms the support for the oscillating part E, with the inclined plane $e$ and the carriage C, and also for the stationary piece F. It is adjustable to different positions in the slots $a$, in order to accommodate books of various widths, but is stationary during the operation of cutting and coloring. The oscillating table is designed to stand upright during those operations, and then, by the handle $e^3$ or other suitable means, to be swung toward the operator, bringing the book away from the knife. In swinging, the oscillating table turns upon the pivots $d$, which project inward from the angles of the bar D. A stop, $d'$, fastened to the bar D, or to any other convenient part of the machine, limits the movement of the part E toward the operator. At each oscillation of the part E upon its pivots $d$ the carriage C is moved a certain distance down the inclined plane by the following mechanism.

Attached to the bar D is the stationary upright piece F, having in its upper portion the cam-groove $f^2$. To allow of vertical adjustment in order to suit the adjustment of the inclined plane $e$, the stationary piece F is carried upon a pin rising from the bar D, and fastened thereto by means of the set-screw $f'$. Affixed to the lower part, $c'$, of the carriage, and forming a part of it, are two similar racks, $q$, one on each side of the carriage and opposite each other, with their teeth projecting below the part $c'$. The teeth of one rack are placed opposite the intervals of the other, and they engage, respectively, with the catches $i^4$ of the escapement device, which is attached to the inclined plane $e$. The escapement device, Figs. 2 and 10, consists of a hanger or bar, $i$, projecting from the under side of the inclined plane $e$, and having at its lower end a pin, $i'$, upon which is pivoted a rocking bar, $i^2$. The upturned ends of the rocking bar $i^2$ carry a shaft, $i^3$, to which are affixed the two catches $i^4$, extending upward on each side of the carriage C and engaging with the racks $q$. At one end of the rocking bar $i^2$ is affixed at a right angle a pin, $i^5$, designed to fit into and traverse the cam-groove $f^2$.

The escapement device is so constructed that the catches $i^4$ can be turned down (to the right in Fig. 1) out of connection with the racks. The plate $i^6$ forms the upturned end of the rocking bar $i^2$ and always stands upright. The plate $i^7$, Figs. 1 and 2, is rigidly attached to the shaft $i^3$, which carries the catches. Between these two plates $i^6$ and $i^7$ lies a handle-bar, $i^8$, loose at one end upon the shaft $i^3$, having a slot through which the shaft $i^3$ passes. The handle-bar $i^8$ is held in the position shown by a pin, $i^9$, affixed to it, which enters a nick in the plate $i^6$, Fig. 10. This pin on the other side of handle-bar $i^8$, Fig. 1, passes through a slot in the plate $i^7$, and has a spring, $i^{10}$, connecting it with some fixed part. If the pin $i^9$ be withdrawn from the nick and the handle-bar $i^8$ turned to a perpendicular position until the pin $i^9$ strikes the shoulder $i^{11}$, the plate $i^7$ is carried with it, and the catches $i^4$ thereby turned down out of connection with the racks $q$.

The operation of the book-carriage is as follows: The cuts in the book are to be made in succession from right to left, the carriage moving from left to right. The book is placed upon the top of the upper part of the carriage, $c$, and held there by the clamps, hereinafter described, in such position that the first cut will be made in the proper place upon the front edge, which is supported by the cutting-table $b$ immediately under the knife $m$. The operator, after making the first cut, oscillates the table $e$ toward him, and by means of that movement the pin $i^5$ of the escapement device traversing the cam-groove $f^2$ releases the rear catch, $i^4$, from its rack and brings the other into engagement with the opposite rack, thereby allowing the carriage C to be drawn by the weight $p$ down the inclined plane for a distance of half the interval between the successive teeth of one rack. While the part E rests against the stop $d'$ the operator finds the place for the next cut, and then returns the part E to its upright position, thereby carrying the pin $i^5$ back through its cam-groove and allowing the weight $p$ to move the carriage C down the inclined plane the other half of the interval between two teeth. The distance between two cuts will be exactly the distance between two teeth of a rack. One or other of the catches $i^4$ is always in engagement with one of the racks. Different spacing may be provided for by means of different sets of racks. When one series of cuts has been made, the catches $i^4$ may be turned down out of connection with the racks, as before explained, and the carriage C pushed up to the top of the inclined plane. The improvement of this escapement device over the one shown in my prior patent is that its action is more positive and sure.

The object of making $e$ an inclined plane is, as explained in my prior patent, to compensate between each cut for the increasing number of leaves lying below the level of the cutting-table $b$, and thus allow the leaves to be cut to extend from the carriage C to the cutting-table $b$ horizontally, or nearly so, in order to produce an even cut. Different books require different inclinations, according to the thickness of the book. The proper incline for the desired vertical interval between the first and last cuts of one series having been determined, the inclined plane $e$ is then set at that inclination by the screw $e^2$, and the top of the carriage is leveled by means of the screw $c^3$. The stationary part F is then adjusted vertically to correspond.

An additional feature in this machine consists of the shaping-stops $n$ near the knife, Figs. 1, 2, and 9. They consist of upright pieces (straight or curved in vertical section) extending along the rear edge of the table $b$ upon each side of the knife and inclined toward the operator. Their object is to shape the edge of the book as it is presented to the knife, holding back the edges of the upper leaves of the section to be cut, so that the successive segments of paper lying under the knife increase in size from the top to the bottom of the cut. They thus cause the cuts to be uniform, whatever the shape of the edge of the book, whether straight or rounded. They are made adjustable in two directions. An angle-plate, $n'$, Figs. 3 and 9, is affixed to the back of the shaping-stop $n$ and has in it a small curved slot. Another angle-plate, $n^2$, is affixed to the rear of the table $b$ and has in it a small horizontal slot. A bolt, $n^3$, passes through both of these slots and has a thumb-nut upon the outside, by which the two angle-plates may be fixed in any position. The horizontal slot in the angle-plate $n^2$ allows the shaping-stop $n$ to be adjusted forward or backward on the table $b$ to make a shallower or deeper cut—that is, to cut less or more from each leaf—and the circular slot in the angle-plate $n'$ allows the inclination of the shaping-stop $n$ to be adjusted in order to allow the knife to cut few or many leaves. These adjustments allow the same shaping-stops to be used for both thick and thin books and those requiring few or many cuts. The two shaping-stops may be united in one piece for ease of alignment or other reason.

The improved coloring device to apply coloring-fluid to the surface of the newly-made cut is shown in Figs. 2, 3, 5, and 6. It consists of a color-bag, $o$, from which the ink or coloring-fluid is led to a small cylindrical block, $o'$, covered with cloth or other porous material, so as to retain a quantity of the fluid upon its surface. The colorer $o'$ is shaped to fit the nick, and is attached to a carriage, $o^2$, which slides in ways upon the bracket $o^3$, affixed to the frame B. It operates automatically in connection with the knife. The cam-rod $o^4$, by which it is operated, is pivoted at its upper end to the sector $u$ and extends downward between a roller or pin, $v$, Figs. 5 and 6, attached to the side of the sliding carriage $o^2$, and another roller or pin, $v'$, attached to the bracket $o^3$. This pin $v'$ may be made adjustable, or may be held to its work by an adjustable spring pressing it forward, so that the amount of pressure exerted upon the surface of the cut by the colorer $o'$ may be regulated by adjusting such spring. While the knife is operating the cam-rod $o^4$, Fig. 2, rises from the position shown and the colorer remains stationary; but the return movement of the sector $u$ carries the cam-rod $o^4$ down until its cam, bearing upon the pin $v$, (as soon as the knife has risen sufficiently,) carries the sliding carriage $o^2$ forward upon its ways and the colorer $o'$ into the cut directly under the knife just as the knife reaches its highest point and the sector $u$ completes its backward oscillation. The cam-rod then rises immediately by means of the forward oscillation of the sector $u$, and the spring $v^2$, Fig. 5, attached to the carriage and to the bracket, brings the colorer back as the knife descends to make another cut.

The color-bag $o$, Figs. 5 and 6, rests upon a support hinged to the sliding carriage $o^2$, and a link, $v^3$, pivoted to the bottom of this support and to the rear of the bracket $o^3$, compels the color-bag, as the carriage $o^2$ is carried forward, to rise above the level of the tube $o^5$, thereby causing a flow of ink to the colorer $o'$. As the carriage moves back, the color-bag is brought down to its original position, thereby shutting off the flow of ink. The cylindrical colorer $o'$ is affixed to a tube, $o^5$, through which the ink is conducted from the flexible tube, the colorer $o^{11}$ connecting with the color-bag, into a well within $o'$. Into this well the absorbent material on the outside of the colorer $o'$ is designed to dip. Each elevation of the color-bag $o$ sends a supply of color into the well in the colorer $o'$. This momentary supply in the well may be so ample that a part of it will overflow onto the absorbent material, and the remainder will by capillary action continue the supply to the outside surface; or the supply in the well may be so scant as to require capillary action for the entire surface-supply. The supply may be regulated by adjusting the bracket end of the link $v^3$ in the holes shown, or by regulating the pressure of the spring $o^{10}$ on the flexible tube $o^{11}$. The position of the colorer $o'$ is adjustable in several ways, as follows: Its stem $o^5$ is circular and passes through a circular hole in a piece, $o^6$, which piece has also a cylindrical stem, $o^7$, passing through an upright projection, $o^8$, of the carriage $o^2$. Thus the colorer $o'$ may be pushed forward or back, turned obliquely upon the stem $o^5$, moved to right or left, and turned up or down upon the stem $o^7$, appropriate set-screws fixing it in any position.

In order to clear away from the cutting-table the pieces of paper or chips cut out by the knife, and thus allow the colorer to reach the book, the following mechanism is provided, by which that part of the cutting-table upon which the cut is made (called the "cutting-block") is dropped from its position and the chips upon it brushed off. The cutting-block $b'$, Fig. 2, is made of wood, bristles packed tightly together, copper, or other material. It forms the top of a sliding piece, $b^2$, sliding in ways within the frame B, and having at its lower end a pin, $b^3$, which works in the cam-slot $g'$ of the cam $g$. The cam $g$ is pivoted to the frame B at $g^2$, and is actuated by the connecting-rod $g^3$, pivoted to it and also to the sector $u$. The cam-slot $g'$ is so shaped that while the pin $b^3$ is traversing one part of it the sliding piece $b^2$ remains down and stationary. While traversing the next part, the sliding piece $b^2$ ascends and carries the cutting-block $b'$ to a level with the rest of the cutting-table $b$ before the knife has descended far enough to cut, and while traversing the third part of the slot—that is, while the knife is making the cut—the cutting-block $b'$ remains stationary as a part of the cutting-table $b$. The colorer $o'$ advances to apply the color while the cutting-block $b'$ is at its lowest position, so that there is nothing which the colorer $o'$ can touch except the sides of the nick to be colored. By the same sliding motion of the carriage $o^2$ the brush $o^9$, which is affixed to it, is carried forward over the cutting-block $b'$ and removes the chips.

In the machine described in my prior patent the action of the knife itself removed the chips; but in this machine they would remain on the cutting-table, and thus hinder the action of the colorer, or further action of the knife, unless removed. That is the main idea connected with a movable cutting-block. To allow of the colorer's action, it is not necessary to brush off the chips if the cutting-block is dropped out of the way. So, also, other methods of moving it may be used. Thus it is seen that the cut is made and colored and the chips left by the knife cleared away by a continuous operation, represented by one revolution of the pulley $j$. Any two of these functions may be performed by the combination of its appropriate operating parts in a machine which employs a different operating device to perform the third function. Thus the knife and colorer may act alone without a removable cutting-block and a brush, as in my former patent, or the knife and brush may act while the color is left to be applied in some other way; or the coloring and brushing may be done by the devices shown, while the cutting is performed in some other way—as, for example, by hand. The cutting-block may even be dispensed with entirely, the edge of the leaves to be cut away lying over an opening in the table, and the knife being arranged to meet the edge of the table with sufficient exactness to make a clean cut.

To best distribute the cuts evenly along the length of the book, it is necessary that it should be held in the same position upon the carriage while one series of cuts is being made. This might be done by hand, but inconveniently. I provide two clamps, $r$, Figs. 1 and 8, upon the upper part, $c$, of the carriage, between which the book is to be held. These consist (see Fig. 8) of a sliding piece, $r$, dovetailed upon the part $c$, and having a set-screw or other device, by which the sliding piece $r$ may be clamped to the part $c$. I prefer the device shown in Fig. 8, in which an eccentric lever, $r'$, pivoted to the sliding piece $r$, bears down upon a flat spring, $r^2$, and presses one end of it against the top of the part $c$ when the lever $r'$ is turned down. Being movable upon the part $c$, various sizes of books may be accommodated between the two clamps. A sharp pin, $r^4$, enters between the leaves, and another pin, $r^5$, sustains the book at its back. The pin $r^4$ prevents the book from leaving the carriage by sliding away from the operator, and the pin $r^5$ prevents it from sliding in the opposite direction. The two thus combine to hold the lower part of the back of the book fast to the carriage, while the rest of the back of the book above those pins is free to yield to the action of the shaping-stops as the front of the book is presented to the knife.

A piece, $r^6$, pivoted or affixed to the book-clamp, is designed to hold the sides of the book upright, so that the knife will without fail make a perpendicular cut.

In some cases it is desirable to clamp the back of the book rigidly to the carriage. For this I employ the form of clamp shown in Figs. 14 and 15, one each side of the book. The sliding piece $r$ carries an upright piece, $r^7$, at the edge of the carriage toward the operator. To the upright piece $r^7$ is bolted a spring, $r^8$, operated upon by the eccentric lever $r^9$. The book being placed in position, the clamp is moved along the book-carriage until the edge of the upright piece $r^7$ meets it, and the spring $r^8$ just slides over the top of the book when the eccentric lever $r^9$ is perpendicular. The lever $r^9$ is then turned down to a horizontal position. The bolts and nuts $r^{10}$ and slots $r^{11}$ allow of vertical adjustment.

The knife is so made as to afford ready vertical adjustment. In the top thereof (see Fig. 11) is a screw, $m^5$, the head of which abuts against the top of the cavity in the shaft $m'$, and which sustains the greater part of the pressure in the cutting. The set-screw $m^4$ merely retains the knife in its position without sustaining much, if any, of the pressure. When the knife is shortened by sharpening or the cutting-block becomes worn by use, a sufficient turn of the screw $m^5$ will adjust the knife to the correct position with exactness and convenience for cutting entirely down through all the leaves. An additional feature which may be used in a knife of this character is shown in Fig. 12, comprising a device by which the pieces of paper cut out by the knife are automatically removed from its interior. A disk, $m^6$, is held within the interior of the knife by a set-screw or other appropriate means, and abuts against the shoulder of the knife to prevent its upward movement. A second disk, $m^7$, having a stem, $m^8$, is designed to move perpendicularly within the knife. The stem $m^8$ passes through the disk $m^6$, and is held from falling by the nut $m^9$ upon the stem above the disk $m^6$. A spiral spring placed between the disks $m^6$ and $m^7$ yields sufficiently to allow the knife to do the cutting, but presses the disk $m^7$ downward as the knife ascends with sufficient force to prevent any wedging of the paper in the cylindrical cavity of the knife.

The power which operates the knife and colorer may be applied continuously; but a better way is to apply it intermittently, the knife and colorer standing still while the operator is oscillating the table E. Any appropriate clutch or other device to apply and shut off power intermittently may be used. The one I have devised for this purpose is shown in Figs. 3, 4, and 7. By it the operator with a motion of his foot can apply the power, which then makes and colors one cut automatically and stops in the position from which the parts started—namely, the one shown in Fig. 2. In Fig. 4 the view is from the right-hand end of Fig. 3, and in Fig. 7 from the opposite end, Fig. 4 representing the power as just applied and Fig. 7 as it has just been thrown off. The foot-lever $t$ has one end pivoted to the frame A and the other end pivoted to a rod, $t'$, which is arranged to move vertically through guides attached to the frame B at the rear of the machine. Pivoted to the rod $t'$, or a projection thereof, is the cam $t^2$, Figs. 3 and 4, and the spring $t^3$, which keeps the lower end of the cam $t^2$ against the rod $t'$.

Attached to the frame B by the bolt $b^5$, Fig. 3, at a point opposite and below the pulley $j$, is a spring, $s$, upon which, at its upper end, is mounted the belt-tightening roller $s'$. Upon the side of the spring $s$ toward the cam $t^2$ is a roller, $s^2$, standing in the course of the cam $t^2$. When the foot-lever $t$ is depressed, the cam $t^2$ descends, and in passing the roller $s^2$ pushes it out, and with it the spring $s$, causing the roller $s'$ to tighten the belt $j'$ upon the pulley $j$. Before the spring $s$ is pushed out an angle-piece or stop, $s^3$, Fig. 4, affixed to the spring $s$, stands underneath a projection, $j^5$, upon the pulley $j$, thus preventing its revolution; but when the spring is pushed out to tighten the belt the stop $s^3$, by the same movement, is released from connection with the projection $j^5$, thus leaving the pulley $j$ free to revolve. The roller $s'$ is kept against the belt for a single revolution of the pulley $j$ by the stop $w$, which is pivoted to the frame B, and which, as the spring $s$ is pushed out, falls outward and downward until it is stopped in a horizontal position by a shoulder on the spring $s$, so as to hold the spring $s$ in the position given it by the action of the cam $t^2$. (See Fig. 4.) The power is thrown off at the end of the revolution by means of a pin upon a pulley, $j$, and a system of levers which raise the stop $w$ and allow the spring $s$ to spring back by its own elasticity, thus separating the roller $s'$ from the belt, and by the same movement bringing the stop $s^3$ underneath the approaching projection $j^5$, in order to stop the revolution of the pulley $j$. This pin $j^6$ (compare Figs. 3, 4, and 7) extends from the pulley at right angles, and toward the end of the revolution strikes the lever $w'$, pivoted upon the spring $s$, or on any convenient part of the frame. The lever $w'$ is attached by the intermediate link, $w^2$, to the arm $w^3$, forming a part of the stop $w$, so that when the pin $j^6$ has reached the end of the lever $w'$, Fig. 7, the stop $w$ has released the spring $s$, and it has sprung back to its first position, leaving the parts in the position in which they stood before the pulley $j$ started, ready to commence another cut. The coiled spring $t^4$, attached to the frame B and to the foot-lever $t$, returns the cam $t^2$ to its original position as soon as the operator removes his foot from the foot-lever $t$. It makes no difference when he does this, so far as the power is concerned. If he does it as soon as the power is applied, the cam $t^2$ in its return passes in front of the roller $s^2$. If he keeps it on until the revolution has been made, the cam $t^2$ is rotated upon its pivot, and thus passes behind the roller $s^2$, and the spring $t^3$ brings it into proper position again to begin the operation. A rod, $t^5$, pivoted to the foot-lever $t$, passes through guides on the frame B, and has at its upper end, adjustably affixed thereto, a piece $t^6$, which extends around in front of the knife, and serves as a press upon the book to keep the leaves closely pressed together while the cutting and coloring are being done.

To operate the machine by hand, very little change is necessary. A handle, $z$, Fig. 13, attached to the shaft $u^2$, takes the place of the power-connections, and in that form the machine may be operated by hand without any further change; but to make better and more convenient operation I provide the stop $z'$, affixed to the frame H at the proper place, to limit the motion of the sector $u$ toward the operator, and also the spring $z^2$, fastened upon the frame H and bearing against a pin attached to the sector $u$. In order to make the cut, the operator brings the handle $z$ toward him until the sector $u$ meets the stop $z'$, and then in order to raise the knife, operate the colorer, and drop the cutting-block, moves the handle in the opposite direction. If he then releases the handle, the spring $z^2$ serves to bring the parts back and stop them in the best position from which to commence another cut.

This same machine may be used with a little adaptation for the purpose of cutting the labels of paper, leather, or other material to be pasted upon the leaf at the bottom of each cut to protect it from wear. This adaptation is shown in Figs. 16 and 17. The knife $m^{10}$ is substantially like that shown in Fig. 12, but has instead of the disk $m^7$ the disk $m^{11}$, to which is attached the bar $m^{12}$, as an extension thereof, extending down through an appropriate opening in the cutting-table $b^4$, or over its edge. The cutting-table is arranged without a removable cutting-block, or the cutting-block $b'$ is rendered stationary at the level of the rest of the table and the connecting-rod $q^3$ removed. A pusher, $o^{12}$, in the form of a fork, is attached to the sliding carriage $o^2$ in place of the colorer. The arms of the fork are just far enough apart, that they can pass the bar $m^{12}$. These parts are operated by the same operating mechanism which cuts and colors the nicks. The pile of paper, $y$, from which the segmental labels are to be cut, lies under the knife against the bar $m^{12}$, the width of which is made somewhat less than the width of the labels to be cut. During the operation of the knife and after it rises the disk $m^{11}$ acts as a press upon the paper and keeps the pile of labels in position until the knife has risen far enough to carry the disk $m^{11}$ with it. The fork $o^{12}$ then advances upon the table and pushes back the pile of labels from under the knife.

I claim as my invention—

1. In an indexing-machine, the combination of a cylindrical knife having a screw-thread on its shaft with a supporting-frame, such frame carrying another screw-thread with which the screw upon the knife-shaft gears, by which the same source of power gives both rotation and longitudinal movement to the knife, substantially as described.

2. In an indexing-machine, the combination of shaft $m'$, having the screw $m^2$ and feather-way $m^3$, and carrying a cylindrical knife, the gear-wheel $u^4$, carrying the feather $u^5$, and the frame H, provided with an interior thread with which the screw $m^2$ gears, by which combination the combined rotary and descending motion is given to the knife.

3. In an indexing-machine, the combination of the book-carriage made in two parts hinged together horizontally, and the table or way upon which it rests, also made in two parts hinged together horizontally to allow of adjustment at various inclinations.

4. In an indexing-machine, the combination of the stationary part F, containing cam-groove $f^2$, with the rocking bar $i^2$, attached to the oscillating table which supports the book-carriage, and racks attached to the book-carriage, such rocking bar having pin $i^5$ to traverse the cam-groove $f^2$, and catches $i^4$ to engage alternately with the racks upon the book-carriage.

5. In an indexing-machine, a shaping-stop affixed to the cutting-table near the knife and inclined forward so as to push back from the knife the edges of the upper leaves progressively.

6. In an indexing-machine, the shaping-stop $n$, adjustably attached to the cutting-table by means of the plate $n'$, having a curved slot, the plate $n^2$, having a horizontal slot, and the bolt and nut $n^3$.

7. In an indexing-machine having a cylindrical knife, the cylindrical colorer $o'$, made of some hard material and covered on the side which enters the nick cut out by the knife with an absorbent surface, and also having a well containing coloring-fluid, into which the end of the absorbent surface dips to supply the outer surface of the colorer with fluid by capillary attraction, substantially as described.

8. In an indexing-machine, the combination of the colorer $o'$, having a cylindrical stem, $o^5$, with the supporting-piece $o^6$, having a cylindrical stem, $o^7$, which passes through some supporting part of the sliding carriage $o^2$, and appropriate set-screws in the supporting-piece $o^6$ and the stem $o^7$, such combination affording the various adjustments of the colorer.

9. In an indexing-machine, the combination of sliding carriage $o^2$, carrying a colorer, bracket $o^3$, upon which the sliding carriage is supported, spring $v^2$, and cam-rod $o^4$, pivoted upon the sector $u$ and operating the sliding carriage.

10. In an indexing-machine, the cutting-block $b'$, arranged as a movable part of the cutting-table, in combination with mechanism, substantially as described, to lower and raise it between each cut.

11. In an indexing-machine, the combination of the movable cutting-block $b'$, attached to the sliding piece $b^2$, slotted cam $g$, pivoted upon the frame, and connecting-rod $g^3$, pivoted to the cam $g$ and to the sector $u$.

12. In an indexing-machine, the combination of sliding carriage $o^2$, provided with spring $v^2$ and carrying the brush $o^9$, cam-rod $o^4$, pivoted to and operated by the sector $u$, and the movable cutting-block $b'$, also operated by the sector $u$ through the connecting-rod $g^3$, slotted cam $g$, and sliding piece $b^2$.

13. In an indexing-machine, a book-clamp adapted to slide upon the top of the book-carriage and be clamped thereto at any point, having the pointed pin $r^4$ and the pin $r^5$ to retain the book upon the carriage, and yet allow of flexibility in the back of the book.

14. In an indexing-machine, the combination of shaft $m'$, carrying a knife and operated by the sector $u$, the sliding carriage $o^2$, provided with spring $v^2$ and carrying a colorer, and the cam-rod $o^4$, such cam-rod being also pivoted to and operated by the sector $u$.

15. In an indexing-machine, the combination of the shaft $m'$, carrying a knife and operated by the sector $u$, the sliding carriage $o^2$, provided with spring $v^2$ and carrying the brush $o^9$, the cam-rod $o^4$, also pivoted to and operated by the sector $u$, and the movable cutting-block $b'$, also operated by the sector $u$ through the connecting-rod $g^3$, slotted cam $g$, and sliding piece $b^2$.

16. In an indexing-machine, the combination of sliding carriage $o^2$, provided with spring $v^2$ and carrying both a colorer and the brush $o^9$, cam-rod $o^4$, pivoted to and operated by the sector $u$, and the movable cutting-block $b'$, also operated by the sector $u$ through the connecting-rod $g^3$, slotted cam $g$, and sliding piece $b^2$.

17. In an indexing-machine, the combination of shaft $m'$, carrying a knife and operated by the sector $u$, the sliding carriage $o^2$, provided with spring $v^2$ and carrying both a colorer and the brush $o^9$, the cam-rod $o^4$, also pivoted to and operated by the sector $u$, and the movable cutting-block $b'$, also operated by the sector $u$ through the connecting-rod $g^3$, slotted cam $g$, and sliding piece $b^2$.

18. In combination with the knife $m$, the disk $m^6$, the disk $m^7$, having stem $m^8$, passing through and supported upon the other side of the disk $m^6$, and a coiled spring lying between such disks, substantially as and for the purpose described.

19. In combination with an indexing-machine, the belt-tightening device consisting of lever $t$, cam $t^2$, operated by such lever, spring $s$, carrying the belt-tightening roller $s'$, and roller $s^2$, lying in the course of the cam $t^2$, and the stop $w$, pivoted to the frame.

20. In combination with an indexing-machine, the belt tightening and releasing device consisting of lever $t$, cam $t^2$, operated by such lever, spring $s$, carrying the belt-tightening roller $s'$, the roller $s^2$, lying in the course of the cam $t^2$, and the stop $s^3$, the pulley $j$, provided with the projection $j^5$ and pin $j^6$, and the stop $w$, pivoted to the frame and connected with a lever or system of levers through which the pin $j^6$ raises the stop $w$ upon the completion of one revolution.

21. In an indexing-machine to be operated by hand, in combination with the sector $u$, through which the various parts are operated, the spring $z^2$, attached to the frame and bearing against a pin affixed to the sector $u$, substantially as and for the purpose described.

22. In a label-cutting machine, the combination of the shaft $m'$, carrying the knife $m^{10}$ and operated by the sector $u$, the sliding carriage $o^2$, provided with springs $v^2$ and carrying the pusher $o^{12}$, and the cam-rod $o^4$, also pivoted to and operated by the sector $u$.

In witness whereof I have hereunto set my hand, this 29th day of July, 1887, in the presence of two witnesses.

F. W. HEWES.

Witnesses:
 GEO. C. BRAINERD,
 SALTER S. CLARK.